2,842,553
PROCESS OF PREPARING IMIDAZOLIDINE-THIONES

John D. Christian, Texas City, Tex., assignor to Monsanto Chemical Company, St. Louis, Mo., a corporation of Delaware No Drawing. Application July 13, 1955
Serial No. 521,880

9 Claims. (Cl. 260—309.7)

This invention relates to certain imidazolidinethiones derived from ketone cyanohydrins and, more particularly, to an improved method for their preparation.

Imidazolidinethiones are interesting organic compounds useful as intermediates in many syntheses and particularly in the synthesis of amino acids. Their preparation by the reaction between ketone cyanohydrins and ammonium sulfide has been described by Bucherer and Brandt, J. prakt. Chemie, 140, 129–50 (1934). However, reaction times reported are impractically lengthy and yields are low. I have now discovered that excellent yields of imidazolidinethiones may be obtained in more practical reaction times by including in the reaction, in addition to the reactants employed by Bucherer et al., the ketone corresponding to the ketone cyanohydrin employed. The added ketone does not merely serve as a reaction medium, but actually takes part in the reaction and results in significantly higher yields of the desired product. For example, acetone cyanohydrin, acetone, and ammonium sulfide react according to the equation

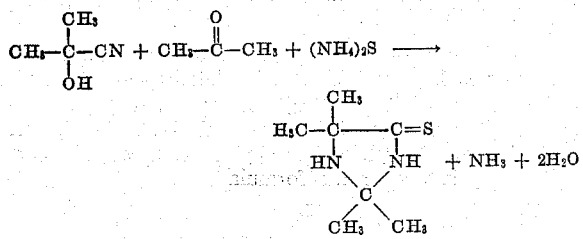

to produce 2,2,5,5-tetramethyl-4-imidazolidinethione in yields above 90%.

In practicing the invention, a ketone cyanohydrin, its corresponding ketone, and an aqueous solution of ammonium sulfide are heated together and the product imidazolidinethione is readily recovered from the reaction mixture as a crystalline material in a high state of purity by a simple filtration operation.

The following examples are presented to illustrate the invention but are not to be construed as limiting it in any manner.

Example I

About 602 g. (3 moles) of a 22.6% aqueous solution of ammonium sulfide was charged with one liter of water to a round-bottomed reaction flask equipped with a stirrer and thermometer. To this was added slowly, with thorough and continuous stirring, a mixture of 170 g. (1.9 moles) of acetone cyanohydrin and 170 g. (approximately 3.0 moles) of acetone while the flask was heated gradually to raise the temperature from an initial 25° C. to the maximum temperature of 47° C., reached when about 80% of the mixture had been added. Additon of the mixture required about two hours. After the addition of reactants was completed, the reaction mixture was maintained at 45–50° C. for one hour. It was then allowed to cool, after which it was filtered to recover the crystalline product which was allowed to dry for two days in the open air. The filtrate liquor was subjected to several successive evaporations and crystallizations. A total of 283 g. (1.79 moles) of 2,2,5,5-tetramethyl-4-imidazolidiethione having a melting point of 153.5°–154.5° C. was produced, representing a yield of more than 94.5%, based on the acetone cyanohydrin employed.

Example II

A mixture of 25 g. (0.2 mole) of cyclohexanone cyanohydrin and 20 g. (0.202 mole) of cyclohexanone was prepared and stored in a dropping funnel. A round-bottomed reaction flask fitted with a stirrer and thermometer was charged with 60.2 g. of a 22.6% aqueous solution of ammonium sulfide (13.6 g. (NH$_4$)$_2$S or 0.3 mole) and 60 ml. of water. The solution was heated to a temperature of 45° C. and the contents of the dropping funnel were added slowly and with stirring over a period of about 80 minutes while the temperature was maintained at 45–50° C. Some crystal formation was observed in the flask after about half of the cyclohexanone cyanohydrin-cyclohexanone mixture had been added. The reaction mixture was maintained at 45–50° C. for one hour after addition of the reactants was completed. The mixture was allowed to cool, then was filtered, and the crystalline reaction product was dried. Approximately 43 g. of cream-white crystals of dispiro [5.1.5.2] diaza-7,14-pentadecanethione-15, melting at 224.5°–225.5° C. was obtained. This compound has a structure analogous to the product of Example I, as follows:

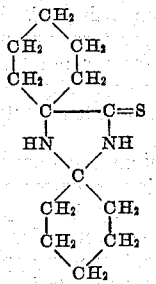

Several recrystallizations from methanol improved the color of the crystalline product without affecting its melting point. Identification was further substantiated by analyses for nitrogen (Kjeldahl), carbon, hydrogen and sulfur content. Results were as follows:

|  | Theoretical | Found |
|---|---|---|
| Percent N | 11.76 | 11.82 |
| Percent C | 65.46 | 66.5 |
| Percent H | 9.31 | 9.54 |
| Percent S | 13.45 | 13.64 |

It is to be noted that the yield of practically pure product obtained in this case was 90%, based on the cyclohexanone cyanohydrin starting material.

Example III

A somewhat different technique was employed in the preparation of dispiro [4.1.4.2] diaza-6,12-tridecanethione-13. About 0.5 mole of liquid HCN (19.5 ml.) was stabilized by the addition of 2 ml. of syrupy phosphoric acid. To this was added one mole (84.1 g.) of cyclopentanone and the mixture was placed in a chilled dropping funnel. The ketone-HCN mixture was then added dropwise over a period of about 1.5 hours, to 225 g. of an aqueous solution of commercial ammonium sulfide (22.6%) mixed with 250 ml. of ethanol contained in a 1-liter, round-bottomed reaction flask equipped with a condenser and stirrer. The temperature of the reaction mixture was maintained at about 30–35° C. by the exothermic nature of the reaction. Some "spitting" of the drops was observed as they struck the surface of the liquid in the flask which could probably be attributed to the heat of reaction between the HCN and the ketone. After addition of the reactants was complete, the reaction mixture was heated to about 55° C. and maintained between that temperature and about 60° C. for approximately one hour. The mixture was then cooled and filtered to recover the crystalline dispiro [4.1.4.2] diaza-6,12-tridecanethione-13. As in Example I, the filtrate liquor was subjected to several successive evaporations and crystallizations. A total of 75.6 g. of product was obtained, representing a yield of 73.5% of the theoretical. A portion of the product twice crystallized from methanol had a melting point of 195–6° C. This imidazolidinethione has the structure:

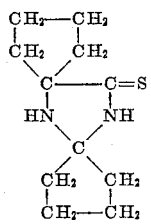

*Example IV*

The procedure of Example I is followed, using acetophenone cyanohydrin, acetophenone, and ammonium sulfide as the reactants and a good yield of crystalline 2,5-dimethyl-2,5-diphenyl-4-imidazolidinethione is recovered from the reaction mixture upon filtration.

Some variations from the procedure given in the examples may be made in practicing the invention without departing from the scope thereof. For example, considerable latitude in temperature is permissible. Any temperature in the range from room temperature (20° C.) to about 100° C. may be used. The reaction, however, is preferably carried out at temperatures from about 35° C. to about 50° C.

While the stoichiometric quantities are the preferred ones for the reaction, excesses of either the ketone or ammonium sulfide may be employed, since both are readily and easily recovered for recycle purposes. No particular advantage, however, appears to be gained by the employment of the reactants in excess. The process is particularly adapted to the use of commercial ammonium sulfide readily available on the market.

The reaction may be carried out in alcoholic as well as in aqueous medium. Methanol, ethanol, isopropanol and the like may be used as reaction media to insure that the reaction mixture remains workable, i. e., its consistency is such that the mass, as the crystalline product forms, may be agitated sufficiently to insure the contact of reactants necessary to effect complete conversion.

Suitable ketone cyanohydrins, in addition to those mentioned in the examples, to which the invention is applicable include symmetrical and asymmetrical aliphatic ketone cyanohydrins such as diethyl ketone cyanohydrin, methyl ethyl ketone cyanohydrin, methyl propyl ketone cyanohydrin, methyl isopropyl ketone cyanohydrin, diisopropyl ketone cyanohydrin, ethyl isopropyl ketone cyanohydrin, methyl butyl ketone cyanohydrin, methyl isobutyl ketone cyanohydrin, and the like; cycloaliphatic ketone cyanohydrins and their derivatives such as cyclopentanone cyanohydrin, 2-methylcyclohexanone cyanohydrin, 2,3-dimethylcyclohexanone cyanohydrin, 2-methylcyclopentanone cyanohydrin and the like; aryl substituted aliphatic ketone cyanohydrins or mixed aromatic-aliphatic ketone cyanohydrins such as methyl benzyl ketone cyanohydrin, methyl naphthyl ketone cyanohydrin and the like. The corresponding ketone reactant in each of these cases would include respectively, symmetrical and asymmetrical aliphatic ketones such as diethyl ketone, methyl ethyl ketone, methyl propyl ketone, methyl isopropyl ketone, diisopropyl ketone, ethyl isopropyl ketone, methyl butyl ketone, methyl isobutyl ketone and diisobutyl ketone; cycloaliphatic ketones such as cyclopentanone, 2-methylcyclohexanone, 2,3-dimethyl cyclohexanone, 2-methyl cyclopentanone and the like; aryl substituted aliphatic ketones or mixed aromatic-aliphatic ketones such as methyl benzyl ketone, methyl naphthyl ketone, and the like.

Instead of employing the ketone cyanohydrins themselves as starting materials, substantially equimolar proportions of the ketone and hydrocyanic acid may be substituted in the reaction as demonstrated in Example III. Best results are obtained if the HCN is stabilized with an acidic material to insure the absence of any alkali and prevent the formation of any cyanohydrin until all the reactants are brought together. Suitable acidic materials for this purpose are the mineral acids, such as hydrochloric acid, sulfuric acid, phosphoric acid and boric acid; organic acids such as propionic acid, acetic acid, and benzoic acid; and salts such as zinc chloride, zinc sulfate and the like. When the ketone-HCN mixture is employed as the starting material instead of the cyanohydrin, the molecular ratio of the mixture used is 2:1.

What is claimed is:

1. An improved process for the preparation of imidazolidinethiones which comprises heating together at least equimolecular proportions of a ketone cyanohydrin of the formula RR'C(OH)CN wherein R and R' are chosen from the group consisting of unsubstituted alkyl, cycloalkyl, aryl, alkaryl, and aralkyl radicals with its corresponding ketone of the formula

wherein R and R' are chosen from the group consisting of unsubstituted alkyl, cycloalkyl, aryl, alkaryl, and aralkyl radicals and ammonium sulfide.

2. An improved process for the preparation of imidazolidinethiones which comprises heating, at temperatures from about 20° C. to about 100° C., at least equimolecular proportions of a ketone cyanohydrin of the formula RR'C(OH)CN wherein R and R' are chosen from the group consisting of unsubstituted alkyl, cycloalkyl, aryl, alkaryl, and aralkyl radicals with its corresponding ketone of the formula

wherein R and R' are chosen from the group consisting of unsubstituted alkyl, cycloalkyl, aryl, alkaryl, and aralkyl radicals and ammonium sulfide.

3. An improved process for the preparation of imidazolidinethiones which comprises heating together, at temperatures from about 35° C. to about 50° C., at least equimolecular proportions of a ketone cyanohydrin of the formula RR'C(OH)CN wherein R and R' are chosen from the group consisting of unsubstituted alkyl, cycloalkyl, aryl, alkaryl, and aralkyl radicals with its corresponding ketone of the formula

wherein R and R' are chosen from the group consisting of unsubstituted alkyl, cycloalkyl, aryl, alkaryl, and aralkyl radicals and ammonium sulfide and recovering the imidazolidinethione from the reaction mixture by filtration.

4. An improved process for the preparation of 2,2,5,5-tetramethyl-4-imidazolidinethione which comprises heating together, at temperaures from about 35° C. to about 50° C., at least equimolecular proportions of acetone cyanohydrin, acetone and ammonium sulfide, and recovering the 2,2,5,5-tetramethyl-4-imidazolidinethione from the reaction mixture by filtration.

5. An improved process for the preparation of imidazolidinethiones which comprises heating, at temperatures from about 20° C. to about 100° C., at least equimolecular proportions of a cycloaliphatic ketone cyanohydrin with its corresponding ketone and ammonium sulfide.

6. An improved process for the preparation of imidazolidinethiones which comprises heating together, at temperatures from about 35° C., to about 50° C., at least equimolecular proportions of a cycloaliphatic ketone cyanohydrin with its corresponding ketone and ammonium sulfide and recovering the imidazolidinethione from the reaction mixture by filtration.

7. An improved process for the preparation of dispiro [5.1.5.2] diaza-7,14-pentadecanethione-15 which comprises heating together, at temperatures from about 35° C. to about 50° C., at least equimolecular proportions of cyclohexanone cyanohydrin, cyclohexanone, and ammonium sulfide and recovering the dispiro [5.1.5.2] diaza-7,14-pentadecanethione-15 from the reaction mixture by filtration.

8. An improved process for the preparation of 2,5-dimethyl-2,5-diphenyl-4-imidazolidinethione which comprises heating together, at temperatures from about 35° C. to about 50° C., at least equimolecular proportions of acetophenone cyanohydrin, acetophenone, and ammonium sulfide and recovering the 2,5-dimethyl-2,5-diphenyl-4-imidazolidinethione from the reaction mixture by filtration.

9. An improved process for the preparation of imidazolidinethiones which comprises heating together at least equimolecular proportions of (1) a ketone cyanohydrin chosen from the group consisting of ketone cyanohydrins of the formula RR'C(OH)CN wherein R and R' are chosen from the group consisting of unsubstituted alkyl, cycloalkyl, aryl, alkaryl, and aralkyl radicals and ketone cyanohydrins of the formula R''=C(OH)CN wherein R'' is a cycloaliphatic radical with (2) the corresponding ketone chosen from the group consisting of ketones of the formula

wherein R and R' are chosen from the group consisting of unsubstituted alkyl, cycloalkyl, aryl, alkaryl, and aralkyl radicals and ketones of the formula R''=C=O wherein A'' is a cycloaliphatic radical, and (3) ammonium sulfide.

References Cited in the file of this patent
Bucherer et al.: J. prakt. Chemie, 140, 147–50 (1934).

UNITED STATES PATENT OFFICE

CERTIFICATE OF CORRECTION

Patent No. 2,842,553                                 July 8, 1958

John D. Christian

It is hereby certified that error appears in the printed specification of the above numbered patent requiring correction and that the said Letters Patent should read as corrected below.

Column 1, line 69, for "Additon" read -- Addition --; column 6, line 25, for the symbol "$A''$" read -- $R''$ --.

Signed and sealed this 2nd day of December 1958.

(SEAL)
Attest:

KARL H. AXLINE
Attesting Officer

ROBERT C. WATSON
Commissioner of Patents